L. K. STENDAHL.
SCREW RETAINER.
APPLICATION FILED MAY 25, 1921.

1,409,606.

Patented Mar. 14, 1922.

Inventor
LUDWIG K. STENDAHL
By his Attorneys,

UNITED STATES PATENT OFFICE.

LUDWIG K. STENDAHL, OF FAIRFIELD, CONNECTICUT, ASSIGNOR TO THE BRYANT ELECTRIC COMPANY, OF BRIDGEPORT, CONNECTICUT, A CORPORATION OF CONNECTICUT.

SCREW RETAINER.

1,409,606.  Specification of Letters Patent.  Patented Mar. 14, 1922.

Application filed May 25, 1921. Serial No. 472,425.

*To all whom it may concern:*

Be it known that I, LUDWIG K. STENDAHL, a subject of the King of Sweden, residing at Fairfield, in the county of Fairfield and State of Connecticut, United States of America, have invented certain new and useful Improvements in Screw Retainers, of which the following is a specification.

My invention relates to screw-retaining devices, and particularly to a device adapted to abut the thread of a screw to hold the latter against escape from a member through which it freely passes. The device is particularly designed for use in connection with two-part separable bodies adapted to be united by a screw or screws.

In the accompanying drawings—

Figure 1:
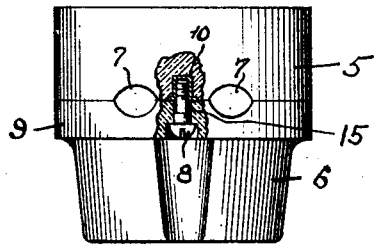
Fig. 1 is a broken side elevation of the two-piece body of an electrical flush receptacle to which my invention is applied in one form.

Among the various uses to which the present invention may be put, one of the most extensive is that for retaining the screws which are employed to unite separable portions of an electric fitting. This numerous class of various types of fittings may be illustrated by the flush receptacle shown in Fig. 1, which comprises base 5 and cap 6 of insulating material between the juxtaposed faces of which the line wires are accommodated in channels 7. In order to conveniently introduce the wires into these channels and to secure them to the usual wire terminals (not shown), housed between the cap and base, it is necessary to remove the cap 6. The latter is customarily secured to the base by means of screws 8, one of which is shown, passing through the flange 9 of the cap and taking into a tapped ferrule 10, or other suitable device, associated with the base 5. When the cap and base are separated for the insertion and attachment of the wires, the loosened screws 8 are apt to fall out of the holes in the cap flange 9 through which they pass, and become lost, with resulting inconvenience or actual danger to the installation by reason of the omission of one or more of the securing screws.

The present invention provides an inexpensive, readily applied, device for securing the screw in the hole in the cap through which it passes, so that there is no danger of its loss while the cap is detached from the base.

Figure 2:
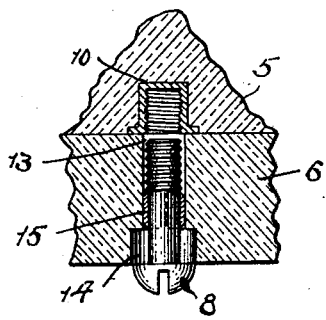
Fig. 2 is an enlarged section of portion of the receptacle having the screw-retaining device.
Figure 3:
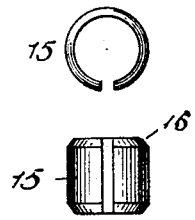
Fig. 3 shows the screw-retaining member alone in plan and side elevation.
Figure 4:
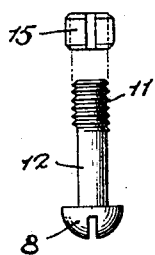
Fig. 4 is a side elevation of the screw and retaining member detached.

As clearly shown in Fig. 4, the thread 11 of the screw 8 slightly exceeds in diameter the shank portion 12, as is common in roll-threaded screws. The hole 13 in the cap 6 through which the screw passes, terminates at one end in a countersunk well 14 to receive the head of the screw. The screw retaining device in the form here shown, consists of a split ring or collar 15 of such normal internal diameter that it may be passed over the thread 11 of the screw to the plain shank 12. The over-all diameter of the collar, however, is slightly greater than the diameter of the hole 13 through which the screw passes. Upon being forced into the hole therefor, its internal diameter is so reduced that while the shank 12 of the screw plays with relative freedom in the collar, the inner end of the latter engages the thread 11 of the screw, and thus prevents the escape of the screw from the hole 13. The collar 15 is preferably of spring metal, so that it frictionally grips the wall of the hole 13 with sufficient pressure to maintain itself and the screw in position as illustrated in Fig. 2. To facilitate its insertion, one or both ends of the ring may be beveled as at 16.

The method of installation is readily understood. The collar 15 is slipped over the thread 11 of the screw onto the shank 12 and bears against the head of the screw when the latter is inserted in the hole 13. As the head of the screw is pressed down into the well 14, the collar 15 is forced into the hole 13 and contracts around the shank 12, as above described. The width of the collar is of course such that the screw has sufficient play therein to permit it to be unscrewed from the tapped ferrule 10 without displacing the collar in the hole 13.

As above stated, this screw-retaining device may be used not only in electrical fittings of various sorts, but also for holding a screw in any structure where such a retaining device is desired. The particular size and shape of the screw, and the particular configuration of the retaining ring are subject to many variations without departing from the underlying principles of what I claim as my invention.

I claim—

1. The combination of a member having a hole to accommodate a screw, with a screw having a thread spaced by a plain shank of less diameter from the head of the screw, said thread and plain shank of the screw passes freely through said hole in said member, and a retaining member arranged on said plain shank and engaging the wall of said hole in said member, said retaining member abutting the thread of the screw to prevent the escape of the screw from the hole.

2. A screw having a thread spaced by a plain shank of less diameter from the head of the screw, in combination with a contractile retaining member surrounding said plain shank, and adapted to be reduced to a less diameter than that of said thread to abut the latter, for the purpose described.

3. A screw having a thread spaced by a shank of less diameter from the head of the screw, in combination with a retaining member having, in the inserted position of the screw, a less diameter than that of the thread of the screw, and forming a retaining abutment member engaged with lost motion between the head and thread of the screw.

4. A member pierced to accommodate a screw, in combination with a screw having a thread spaced from the head of the screw by a shank of less diameter, means insertable with said screw into the hole through said member and engaging the wall of said hole, said means serving to retain the screw against escape from said hole.

5. A member pierced to freely accommodate a screw, in combination with a screw having a thread spaced from the head of the screw by a plain shank of less diameter, together with a contractile member on said plain shank of the screw frictionally engaging the wall of the hole in which the screw is accommodated, and forming an abutment for the thread of the screw on the outward movement of the latter.

6. A rolled thread screw having a plain shank spacing the head of the screw from the threaded area of the shank, in combination with a contractile collar on the plain shank of the screw, adapted upon the insertion of the screw in a suitably pierced body, to be compressed around said shank to form a stop preventing the escape of the screw from said body.

In testimony whereof I have signed my name to this specification.

LUDWIG K. STENDAHL.